United States Patent
Chen

(10) Patent No.: US 7,924,536 B2
(45) Date of Patent: Apr. 12, 2011

(54) SHORT PROTECTION DEVICE FOR ALTERNATOR

(75) Inventor: Chien-Wen Chen, Erlin Township, Changhua County (TW)

(73) Assignee: Mobiletron Electronics Co., Ltd., Taichung (TW)

( * ) Notice: Subject to any disclaimer, the term of this patent is extended or adjusted under 35 U.S.C. 154(b) by 492 days.

(21) Appl. No.: 12/137,831

(22) Filed: Jun. 12, 2008

(65) Prior Publication Data

US 2009/0168275 A1    Jul. 2, 2009

(30) Foreign Application Priority Data

Dec. 28, 2007   (TW) ............................... 96150954 A

(51) Int. Cl.
   *H02H 7/06* (2006.01)
(52) U.S. Cl. ......................................... 361/20; 361/93.1
(58) Field of Classification Search .................... 361/18, 361/20, 23, 93.1; 322/11, 27, 68
   See application file for complete search history.

(56) References Cited

U.S. PATENT DOCUMENTS

| | | | | |
|---|---|---|---|---|
| 4,555,742 A | * | 11/1985 | Gray et al. ................... | 361/93.4 |
| 4,561,036 A | * | 12/1985 | Morishita et al. ............... | 361/20 |
| 4,602,205 A | * | 7/1986 | Matsuhashi et al. .......... | 320/166 |
| 5,254,935 A | * | 10/1993 | Vercesi et al. .................. | 322/29 |
| 5,744,941 A | * | 4/1998 | Bartol et al. .................... | 322/28 |
| 5,990,666 A | * | 11/1999 | Sekiya et al. ................. | 320/162 |
| 7,102,332 B1 | * | 9/2006 | Sasaki et al. ................... | 322/28 |
| 7,397,224 B2 | * | 7/2008 | Jabaji .............................. | 322/28 |
| 2008/0084191 A1 | * | 4/2008 | Harmon et al. ................. | 322/28 |

* cited by examiner

*Primary Examiner* — Jared J Fureman
*Assistant Examiner* — Christopher J Clark
(74) *Attorney, Agent, or Firm* — Browdy and Neimark, PLLC

(57) ABSTRACT

A short circuit protection device for the protection of an alternator in which turning on/off a trigger switch causes conduction/cutoff of the field current of the field coil of the alternator is disclosed. The protection device enables the field current to pass through a sensor so that when the field current is abnormally high and the voltage drop across the sensor rises, the potential of an input end of a boost circuit electrically connected to the sensor correspondingly arises and an output end of the boost circuit electrically connected to a shutoff device drives the shutoff device to turn off the trigger switch, and the boost circuit further keeps the shutoff device in on-state to hold the trigger switch off till the short circuit condition is eliminated and the protection circuit system is reset.

10 Claims, 3 Drawing Sheets

SHORT PROTECTION DEVICE FOR ALTERNATOR

BACKGROUND OF THE INVENTION

1. Field of the Invention

The present invention relates to a voltage regulator for alternator and more specifically, to a short circuit protection device for use in an alternator for short circuit protection.

2. Description of the Related Art

In a regular vehicle alternator 1, the field coil 10 of the rotor has its two opposite ends in conduction with the DC power source 30 of the storage battery and the voltage regulator 20 through the slip ring and the brush. When the internal circuit of the voltage regulator 20 is normal, the field coil 10 provides a field current that causes the stator to induce a magnetic field upon rotation of the rotor. The alternative current produced upon induction of the stator coil 11 is rectified by the rectifier 12 into direct current for charging the storage battery and functioning of the vehicle electric devices. Therefore, during normal running of the alternator 1, the voltage regulator 20 monitors the potential of the storage battery, and regulates the field coil 10 of the rotor, and controls the stator coil 11 and the rectifier 12 to charge the storage battery. Therefore, the storage battery has sufficient electric capacity to support normal operation of the electric devices of the vehicle.

Referring to FIG. 2, the DC power source 30 of the storage battery goes through the input end of the power transistor 21 of the voltage regulator 20 to conduct the power transistor 21, causing the field current of the field coil 10 to charge the storage battery. When the electric capacity of the storage battery is charged to the saturated potential, the step voltage produced at the zener diode 22 reaches the breakdown critical voltage to conduct the posterior switching transistor 23, and to draw down the control base of the power transistor 21 to low potential, thereby shutting off the power transistor 21 and stopping charging of the storage battery. When the electric capacity of the storage battery is consumed to the potential that is unable to conduct the zener diode 22, the power transistor 21 is conducted to charge the storage battery again. Therefore, the voltage regulator 20 prohibits overcharge of the storage battery by the alternator, maintaining normal operation of the storage battery.

However, vibration of the body of the vehicle after start of the vehicle and continuous rotation of the rotor cause the external insulation of the enameled wire of the rotor to wear quickly. When the brush starts to wear, the fallen graphite dust, fallen solder dust, or any fallen conducting substance may cause a partial short circuit or full short circuit of the field coil 10. At this time, the field current of the short circuit may cause the voltage regulator 20 to enhance the power generating operation of the alternator, and rising of the potential of the storage battery may cause the zener diode 22 to be conducted again so as to turn off the short-circuit current. However, when the potential of the storage battery dropped to the conduction level of the power transistor 21, the short circuit current will go through the power transistor 21. Therefore, the power transistor 21 is being frequently switched between the conduction status and the shutoff status to cause a short circuit oscillation of the voltage regulator 20. The internal junction of the power transistor 21 may be unable to sustain this surge short-circuit current, causing the power transistor 21 to burn out. This short circuit oscillation may cause an overcurrent at the field coil 10, and this overcurrent may cause the power transistor 21 to burn out. When the power transistor 21 is damaged, the alternator may be forced to provide an overvoltage to the electric devices of the vehicle, causing damage to the electric devices.

SUMMARY OF THE INVENTION

The present invention has been accomplished under the circumstances in view. It is therefore one object of the present invention to provide a short circuit protection device, which controls short circuit protection positively, and has a very low circuit power consumption.

To achieve this object of the present invention, the short circuit protection device is electrically coupled to the field coil of the alternator, comprising a trigger switch for controlling the operation of the alternator subject to conduction or cut off the field current produced by the field coil. The short circuit protection device further comprises a sensor, a boost circuit and a shutoff device. The sensor has a very low DC resistance value to lower the energy dissipation of the field coil. An input end and an output end of the boost circuit are respectively and electrically connected to the sensor and the shutoff device. Turning on the trigger switch causes the field current to pass through the sensor. When the field current of the alternator rises abruptly due to a short circuit condition of the field coil, the sensor detects a rise of voltage drop and reacts with rising potential at the input end of the boost circuit so that the potential energy of this rising voltage is rapidly and stably stored in the boost circuit for driving the shutoff device to turn off the trigger switch. The potential at the output end of the boost circuit is maintained during the energy storing time so that the shutoff device is kept in on-state and the trigger switch is kept in off-state, and the alternator does no work till reset of the circuit after elimination of the short circuit condition.

DETAILED DESCRIPTION OF THE INVENTION

Figure 1:
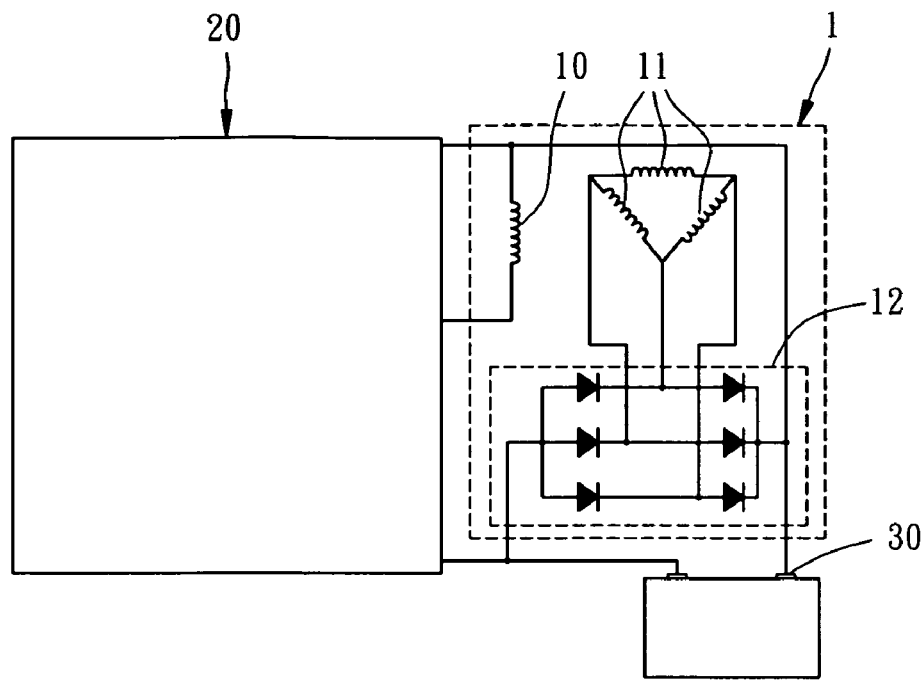
FIG. 1 is a circuit block diagram showing the circuit arrangement a voltage regulator in an alternator according to the prior art.
Figure 2:
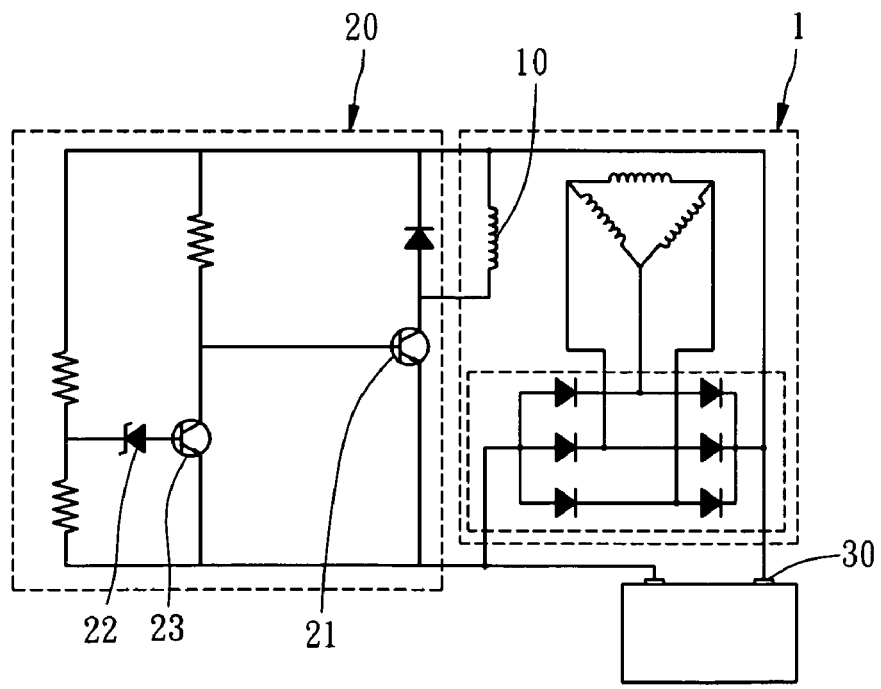
FIG. 2 corresponds to FIG. 1, showing the internal circuit arrangement of the voltage regulator.
Figure 3:
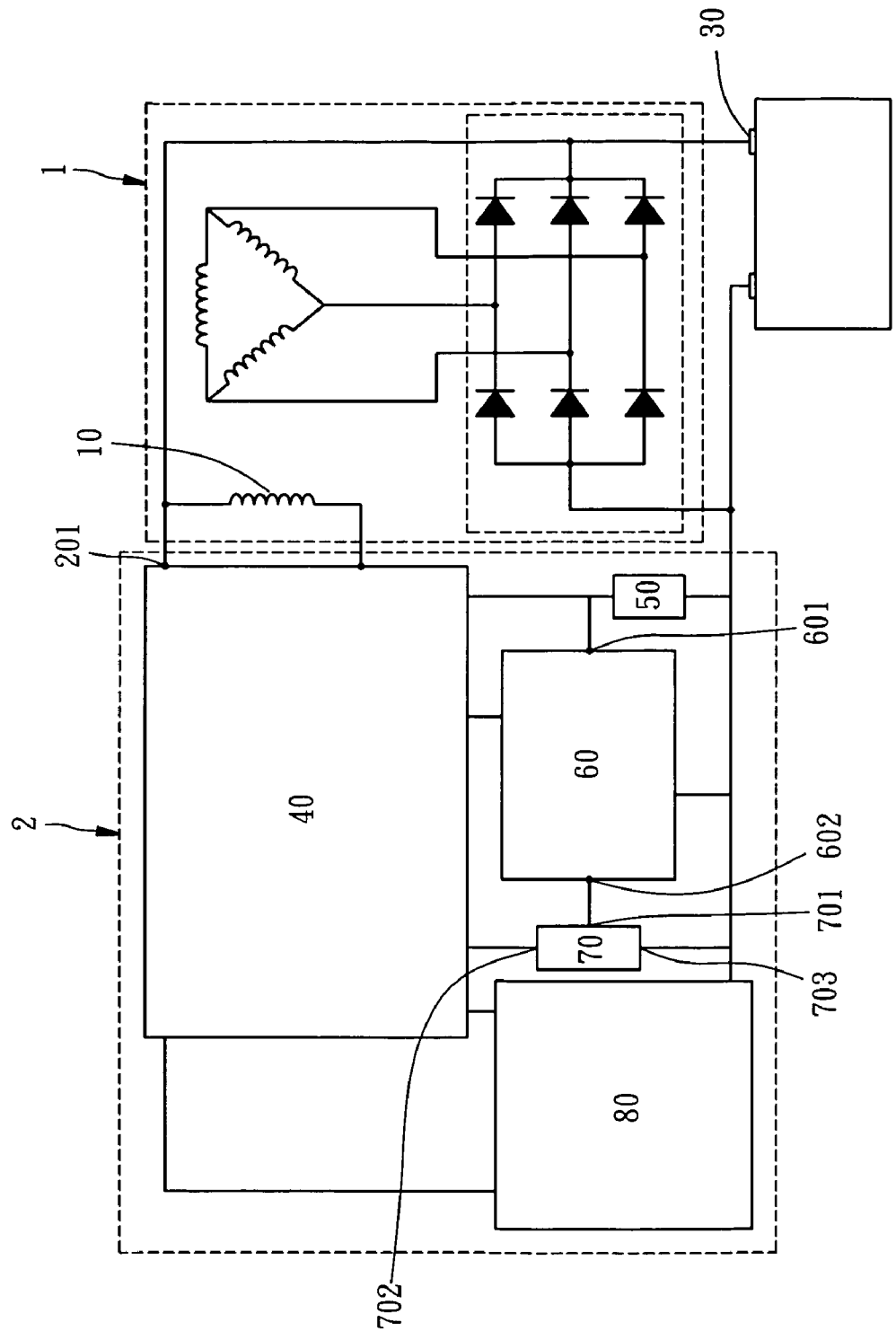
FIG. 3 is a circuit block diagram showing a short circuit protection device installed in an alternator according to the present invention.

Referring to FIG. 3, a short circuit protection device 2 is adapted for monitoring the field current produced by the field coil 10 of an alternator 1 so as to maintain normal functioning of the alternator 1. The short circuit protection device 2 is electrically connected to the brush of the alternator 1 through a power terminal set 201 to obtain the necessary DC potential 30 from the storage battery for circuit operation. The short circuit protection device 2 comprises a triggering circuit 40, a sensor 50, a boost circuit 60, a shut-off device 70, and a voltage-stabilizing circuit 80.

Figure 4:
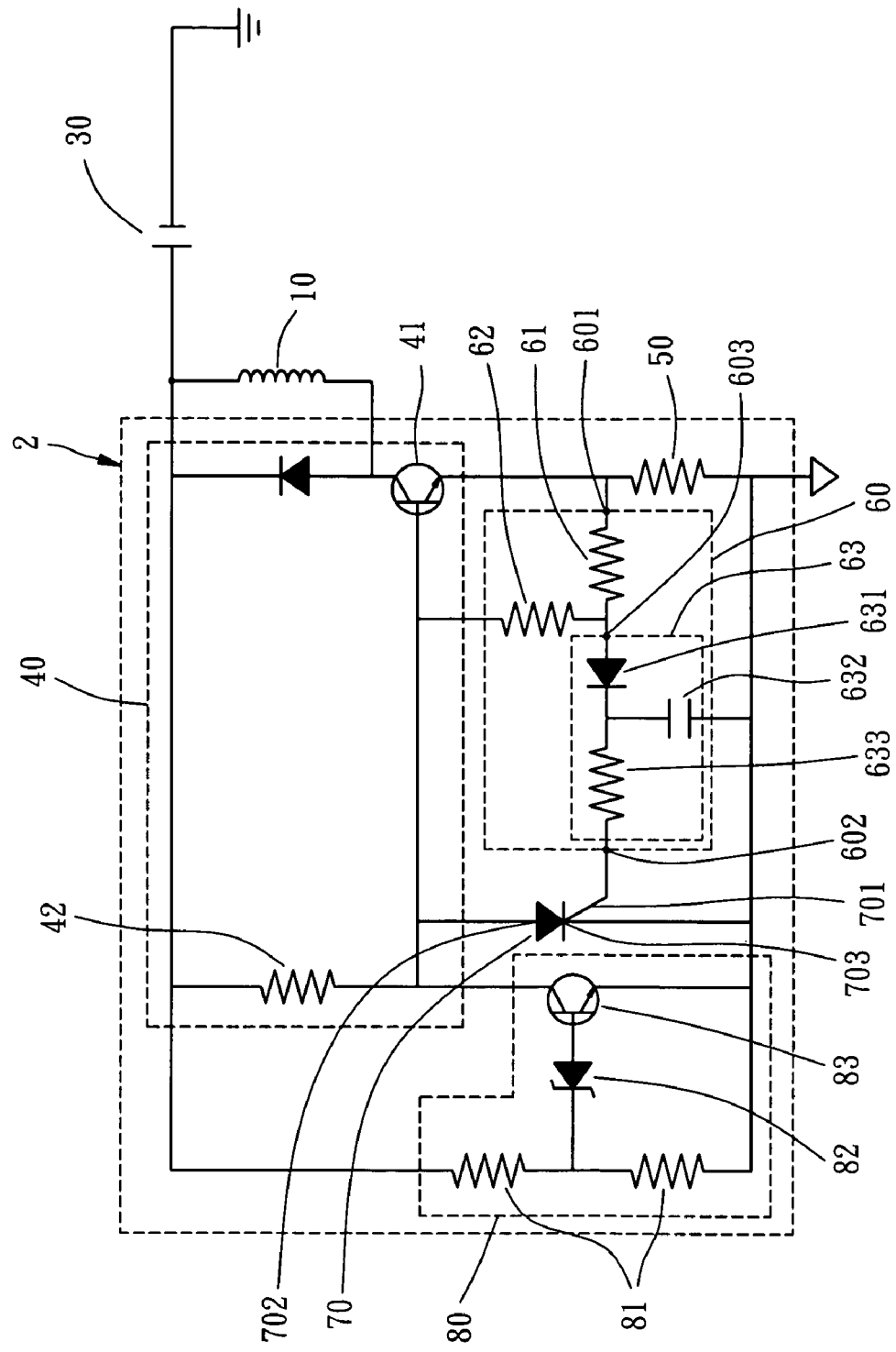
FIG. 4 corresponds to FIG. 3, showing the internal circuit arrangement of the short circuit protection device.

Referring to FIG. 4 and FIG. 3 again, the triggering circuit 40 comprises a trigger switch 41 and a trigger resistor 42. The trigger switch 41 is practical for high power operation to withstand and drive high current conduction. According to the present preferred embodiment, the trigger switch 41 can be a BJT (Bipolar Junction Transistor), or a power transistor with low power dissipation that manufactured by metal-oxide-semiconductor technology like CMOS (Complementary Metal Oxide Semiconductor) or Bi-CMOS (Bipolar-CMOS) integrated transistors. The current output end of the field coil 10 is electrically connected to the trigger switch 21. When the trigger resistor 42 divides the DC potential 30 provided by the storage battery into a threshold voltage for the base terminal of the BJT to turn on the trigger switch 41, a current loop is conducted through the trigger switch 41 and a field current is formed correspondingly by the field coil 10. Therefore, turning on or off of the trigger switch 41 corresponds to the conduction or cutoff of the field current.

The sensor 50 is adapted for detecting the field current passed by the trigger switch 41. According to the present preferred embodiment, the sensor 50 can be a resistor having extremely low DC resistance value to prevent power dissipation when the field current flowing through the sensor 50 during normal operation of the alternator.

The boost circuit 60 has an input end 601, an output end 602, two boost resistors 61 and 62, a sensing end 603, and a one-way charging circuit 63. The two boost resistors 61 and 62 are connected in series with the trigger resistor 42 of the triggering circuit 40 and the sensor 50, and are adapted for reducing the branched current shunt and the divided voltage drop from the DC potential 30 to avoid unnecessary power dissipation and false circuit operation due to the over-flowed shunt current at this series connection. Once an over-flowed high current passes the sensor 50 to raise the potential at the input end 601, the boost resistor 62 is induced to pull up the potential at the sensing end 603, where the input node of the charging circuit 63. The charging circuit 63 according to the present preferred embodiment is comprised of a P-N-junction typed diode 631, a capacitor 632 and a resistor 633. The diode 631 is adapted for prohibiting the charging circuit 63 from outputting current through the sensing end 603, by means of holding the storage charge of the capacitor 632 during the effective storage time and then maintaining the potential at the output end 602 when the potential at the input end 601 drops, thus keeping the capacitor 632 from discharging through the sensing end 603 and ensuring the capacitor 632 be charged to raise the potential at the output end 602 corresponding to the increased potential level at the input end 601 once the sensing end 603 detecting raised potential higher than storage potential within the capacitor 632.

The shut-off device 70 runs subject to the potential at the output end 602 of the boost circuit 60. According to the present preferred embodiment, the shut-off device 70 can be a SCR (silicon-controlled rectifier) or transistor of switching means. The input controlled gate of the SCR is named as a control end 701 that is electrically connected to the output end 602 of the boost circuit 60. The current input node and current output node of the SCR are respectively named as an upper conduction end 702 and a lower conduction end 703 and electrically connected to the trigger switch 41 of the trigger circuit 40 and the grounding potential. When the control end 701 obtained a rise of potential resulted from the output end 602 of the boost circuit 60 and up to reach the critical potential of the controlled gate for turning on the SCR, the upper conduction end 702 and the lower conduction end 703 are electrically conducted with each other to draw down the input potential of the trigger switch 41, which referred as the base terminal of the BJT, to the grounding potential, thereby turning off the trigger switch 41.

The voltage-stabilizing circuit 80 functions similar to a regular voltage regulator, using two shunt resistors 81 and a zener diode 82 to detect the potential of the storage battery and to further control a posterior switching transistor 83 turning on/off the trigger switch 41, so as to effectively regulate the charging status of the storage battery.

In conclusion, when the field current of the alternator 1 is abruptly increased due to a short circuit of the field coil 10, the sensor 50 detects a rise of voltage drop and reacts with rising potential at the input end 601 and sensing end 603 of the boost circuit 60. Subsequently, the capacitor 632 and resistor 633 of the charging circuit 63 store the rapid increased potential energy as keeping the short circuit effect during the storing period and the diode 631 is assistant to prevent reverse output of discharge current through the sensing end 603, thereby positively driving the shutoff device 70 to turn off the trigger switch 41 and holding the potential at the output end 602 to keep the shutoff device 70 in on-state and the trigger switch 41 in off-state so that the alternator 1 is stopped from working. Once make sure the short circuit condition is eliminated, the circuit system can be reset to normal function after the capacitor 632 of the charging circuit 63 is fully discharged. Therefore, the arrangement of the one-way charging circuit 63 of the boost circuit 60 between the sensor 50 and the shutoff device 70 prevents the potential at the control end 701 of the shutoff device 70 from lowering then further turning off the shutoff device 70, while the trigger switch 41 is switched to off-state and withdraws the voltage drop across the sensor 50 due to the short circuit protection action, before elimination of the short circuit condition, and the invention keeps away from the problem of interrupting the short circuit protection of the shutoff device 70 which happened to cause the trigger switch 41 constantly switching between on and off state and to further result in circuit oscillation and damaging to all transistor-like switching elements of the circuit system.

In general, the short circuit protection device of the present invention uses a low power consumption type sensor to detect the normal functioning of the field coil of the alternator, reducing energy dissipation of the field coil. Further, the short circuit protection device uses a boost circuit to regulate and stabilize the detected signal source upon a short circuit of the field coil, thereby effectively controlling the operation of the shutoff device, lowering the chance of false action of the circuit, and holding the short circuit protection action of the short circuit protection device until the short circuit condition is eliminated.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A short circuit protection device installed in an alternator to control the field current produced by a field coil of said alternator, the short circuit protection device comprising:
    a trigger switch electrically connected to said field coil and operated in such a manner that turning on/off said trigger switch corresponds to pass/cut-off said field current;
    a sensor having a current input node and a current output node respectively and electrically connected to said trigger switch and grounding potential, said sensor passing said field current when said trigger switch is turned on;
    a boost circuit comprising an input end and an output end, said input end being electrically connected to the current input node of said sensor; when the potential at said input end rises, the potential at said output end rises; when the potential at said input end drops, the potential at said output end remains unchanged; and
    a shutoff device comprising an upper conduction end, a lower conduction end, and a control end, which are respectively and electrically connected to said trigger switch, grounding potential, and the output end of said boost circuit, when the potential at said control end reaches a predetermined critical potential, said upper conduction end is conducted with said lower conduction end so as to turn off said trigger switch.

2. The short circuit protection device as claimed in claim 1, wherein said trigger switch is selected from one of the group of bipolar junction typed transistor, metal-oxide-semiconductor typed transistor, and the integrated type of both.

3. The short circuit protection device as claimed in claim 1, wherein the potential difference between the potential at said trigger switch and grounding potential after turning on said trigger switch is the voltage drop across said sensor by the field current from said field coil.

4. The short circuit protection device as claimed in claim 1, wherein said boost circuit comprises at least one boost resistor electrically connected to said input end and in series to said sensor, said at least one boost resistor having a DC resistance value greater than said sensor.

5. The short circuit protection device as claimed in claim 4, wherein said boost circuit comprises two said boost resistors respectively and electrically connected to said trigger switch and in series connection with each other.

6. The short circuit protection device as claimed in claim 4, wherein said boost circuit further comprises a diode, said diode having the positive pole thereof electrically connected to said at least one boost resistor.

7. The short circuit protection device as claimed in claim 6, wherein said boost circuit further comprises a capacitor electrically connected to the negative pole of said diode.

8. The short circuit protection device as claimed in claim 7, wherein the output end of said boost circuit is electrically connected in series to the negative pole of said diode through a resistor.

9. The short circuit protection device as claimed in claim 1, wherein said shutoff device is a transistor; said critical potential that conducts said shutoff device is the threshold voltage of said transistor; said upper conduction end and said lower conduction end are the current input node and current output node of said transistor after turning on said transistor.

10. The short circuit protection device as claimed in claim 9, wherein said shutoff device is a silicon-controlled rectifier, and said control end is the gate of said silicon-controlled rectifier.

* * * * *